Patented Dec. 26, 1950

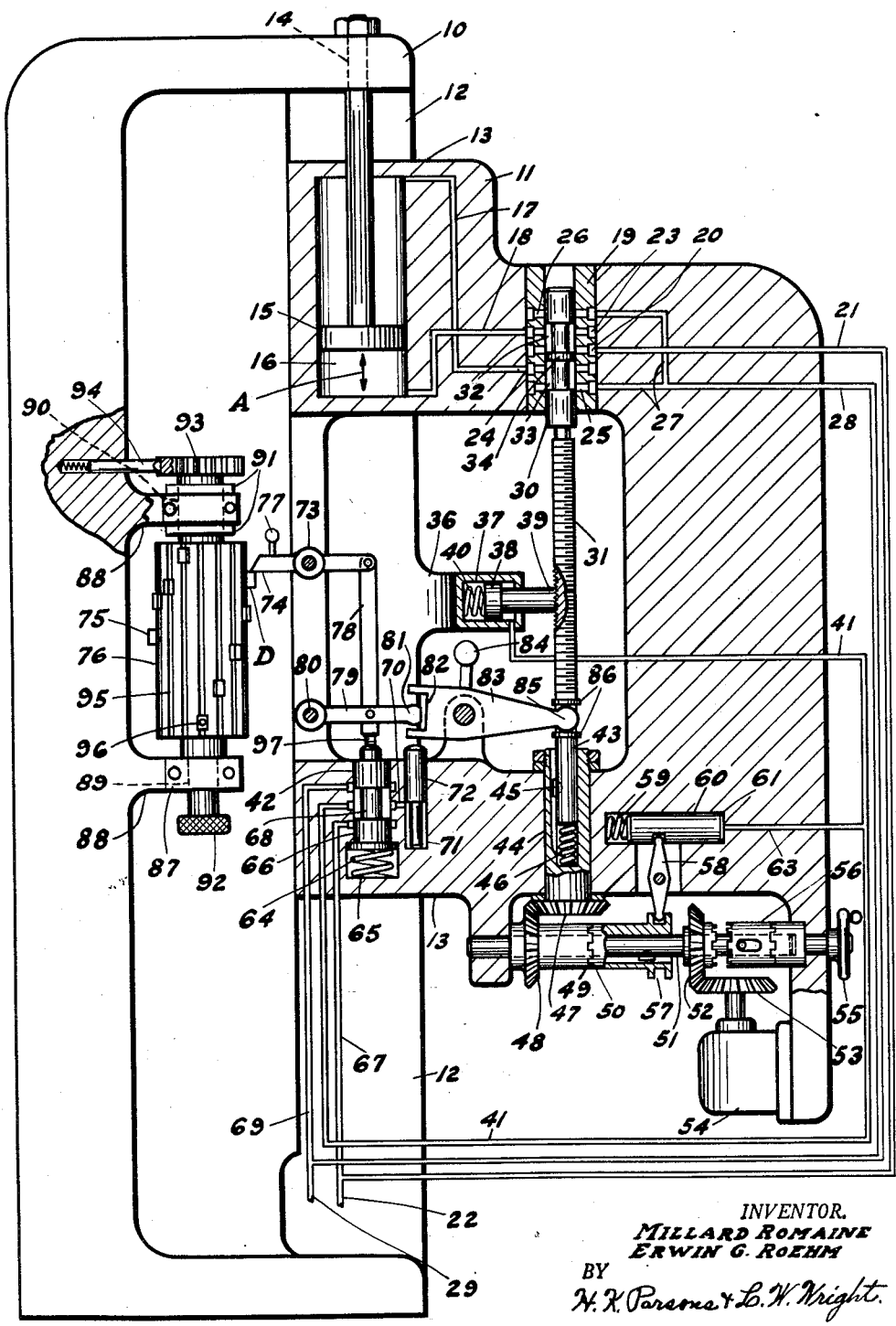

2,535,957

UNITED STATES PATENT OFFICE 2,535,957

PRECISION POSITIONING MECHANISM

Millard Romaine and Erwin G. Roehm, Cincinnati, Ohio, assignors to The Cincinnati Milling Machine Co., Cincinnati, Ohio, a corporation of Ohio Application July 31, 1947, Serial No. 765,154

12 Claims. (Cl. 121—45)

This invention relates to precision positioning devices and has reference to a mechanism particularly adapted for use in accurate determination of the relative positioning movement of machine tool elements or the like.

One of the principal objects of the present invention is the provision of an automatically functioning mechanism by which successive selected accurate positionings of a machine tool slide or the like may be readily effected, enabling the machine to produce duplicate correspondingly tooled work pieces to accurate dimension without the employment of jigs or other expensive or extraneous guiding or work or tool or locating mechanisms.

A further object of the invention is the provision of an accurate positioning control mechanism which may be readily applied to existing machine tools without material alteration in the structure or basic manner of operation thereof.

Another object of the invention is the provision of a precision locating device in which the selected positions may be readily attained in any desired sequence and in which the individual positionings may be readily varied.

A further object of the invention is the provision of a mechanism in which a pattern cam or the like may be employed for attaining the successive positionings and in which varied pattern elements may be substituted one for the other to attain different accurate cyclic movement of the parts.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

The figure is a view partly in elevation and partly in section of a portion of a machine tool such as an hydraulically operated milling machine embodying the present invention with the hydraulic conduits diagrammatically indicated for simplification of understanding of the operation of the invention.

In the drawing the numeral 10 designates a first machine tool element which may be a bed, table, or the like and the numeral 11, a second machine tool element which correspondingly may be either a tool carrying head, column, or other part. The member 10 has been shown as provided with the ways 12 slidably engaging guide portions 13 of the member 11 so that the parts are supported for relative linear sliding movement. It will be understood from the foregoing that dependent on the particular type of machine involved, either the member 10 or the member 11 may be held stationary while the other element is translated with respect thereto. For effecting such translation the member 10 has secured thereto the fixed piston rod 14 having a piston 15 slidably engaged in the double end cylinder 16 formed in or secured to member 11.

Extending from the rod end of the cylinder 16 is a hydraulic conduit 17 and from the piston end of the cylinder a second hydraulic conduit 18. These conduits are adapted to be alternatively connected with pressure or exhaust depending on the desired direction of relative movement of the piston and cylinder. For control of the piston movement there has been provided the valve bushing 19 having the central ported portion 20 coupled with pressure conduit 21 adapted to be supplied with hydraulic actuating medium under pressure as at the point 22 by a suitable conventional pump or equivalent mechanism (not shown). Spaced on opposite sides of the pressure port 20 of the valve bushing 19 are the portings 23 communicating with conduit 18 and 24 communicating with conduit 17. More remotely situated are the portings 25 and 26 connected by the branch conduits 27 with an exhaust conduit 28 discharging as at 29, preferably in the conventional manner into a sump or tank (not shown).

Inasmuch as hydraulic actuating medium circuits of this general nature employing an actuating pump or source of pressure and return conduit for returning the hydraulic actuating medium for reutilization by the pump are well known in the machine tool art, and, as such, form no part of the present invention, these conventional details have not been included in the drawing.

Slidable within the bushing 19 for controlling the various couplings of the ports thereof, is a valve 30 secured to the end of a feed screw 31. This valve has the cannelures or grooves 32 and 33 with an intermediate spool portion 34. In the position of the parts illustrated the spool portion is shown in a depressed position such that the cannelure 32 couples the pressure line 21 with the cylinder line 18, pressure thus flowing into the lower or piston end of the cylinder, causing relative movement of the piston and cylinder as indicated by the arrow A. Likewise, in this position of the parts the cylinder conduit 17 is connected by cannelure 33 with the exhaust line 27—28 so that the relative movement of the parts is unrestrained. It will be understood that if the valve is moved upwardly or if as a result of the pressure conditions shown member 11 and bushing 19 move downwardly spool portion 34 will tend to close off pressure port 20 at the same time that the terminal portions of the valve restrict or block the conduits 27 until a balanced pressure condition is established in the upper and lower portions of cylinder 16 and movement of piston 15 and thus relative shifting of parts 10 and 11 is hydraulically locked or prevented.

It will be noted that the member 10 is provided with a bracket portion 36 having a cylinder 37 in which is slidable piston 38 carrying a half nut element 39. In the position of parts shown nut 39 is maintained in engagement with the threaded portion of screw 31 by expansion of spring 40. A hydraulic conduit 41 is coupled with the inner end of the cylinder 37 in such manner that introduction of pressure into conduit 41 will force the piston to the left, thus engaging nut 39 from screw 31. The pressure reaction in this line is determined by valve 42 as will be hereinafter described.

Screw 31 has an extension 43 slidable within sleeve 44 to which it is keyed as at 45, the screw member being urged in an upward direction relative to sleeve 44 by spring 46. To effect rotation of the sleeve and thus of the keyed screw 31 there have been provided the interengaged bevel gears 47 and 48, the latter having a clutch element 49 which, as shown, is engaged by second clutch element 50 keyed to shaft 51 which is operable alternatively through the gears 52, 53, and motor 54, or manually actuable by pilot wheel 55 depending on the position of the slidable clutch element 56. In the position shown, the parts are coupled for manual operation. Sleeve 50 is provided with a shifter groove 57 engaged by shifter arm 58 indicated as operable toward the right by spring 59 reacting against piston 60. This piston is slidable in cylinder 61 and actuable toward the left upon introduction of pressure from conduit 41 through branch conduit 63.

Reference has been made to the fact that the valve 42 determines the coupling of various of the control conduits with pressure or exhaust. For accomplishment of this the valve is mounted in a cylinder 64 and upwardly urged by spring 65. When in this position its spool portion 66 blocks off the branch pressure conduit 67 while its cannelure 68 couples conduit 41 to the branch reservoir conduit 69. At the same time the conduit 70 extending to cylinder 71 containing the clamp piston 72 is likewise coupled to the reservoir or exhaust conduit 69.

Intermediately pivoted to the member 11 is a lever 73 having at one end an abutment 74 selectively movable into or out of the path of a selected dog 75 on the control drum 76 as by operation of handle 77. The opposite end of this lever or motion transmitting element is coupled by link 78 with a second lever 79 likewise pivoted as at 80 to the member 11 and having an extension terminating in a locating head or valve position determinator 81 fitting into clevice 82 of shifter 83 which is manually oscillatable as by movement of coupled handle 84. Shifter 83 has a terminal yoke portion 85 engaged between the flanges or collars 86 on the screw 31 for controlling and determining longitudinal positioning thereof, when the screw is released by retraction of the half nut 39.

It will be noted that the control drum 76 has been indicated as secured by removable cap plates 87 to the brackets 88 on member 10, preferably having rotating supporting journals as at 89 and 90 and being capable of limited longitudinal adjustment as by variance in position of the thrust collars 91. Rotation may be effected in any desired manner, either manually or automatically, an actuating knob 92 having been shown for purposes of manual indexing or rotation of the drum which is provided with the notched disc or ratchet 93 engageable by the spring pressed detent 94 to lock the drum in any desired indexed position.

The drum 76 is provided with a plurality of longitudinally extending slots 95 in which are adjustably secured as by clamp bolts 96 a multiplicity of trip dogs 75. Indexing of the drum will cause these dogs to project selectively into a position as indicated at D to engage the abutment portion 74 of trip lever 73. As shown, with the relative movement of elements 10 and 11 as indicated by arrow A, lever 73 and the dog 75 at position D have just been brought into engagement. Continued movement of the parts will effect clockwise oscillation of lever 73, causing link 78 to move downward, correspondingly oscillating lever 79 and bringing adjustable abutment 97 at the end of link 78 into engagement with valve 42. The movement of the parts will depress the valve, causing it to block off the reservoir conduit 69 and couple pressure conduit 67 with conduit 41. Pressure will thereby be introduced into conduit 63, moving piston 60 to the left and disengaging drive clutch 49 to stop rotation of the screw. At the same time pressure will move piston 38 to the left, disengaging the half-nut 39 from screw 31. Screw 31 is, therefore, no longer rotated and has been freed for axial movement. This movement, however, is limited by the close interfitting engagement of shift yoke 85 with collars 86 so that the position and amount of movement of the screw and thus of valve 30 is determined by the position of lever 83. Pressure is also coupled through conduits 67 and 70 to move clamp piston 72 upward and lever 83 is tightly clamped against the valve position determining head 81 of the lever 79. The axial position of the screw with respect to the part 10, and thus of the valve coupled therewith, is thus positively determined in accordance with the dog effected position of the valve position determinator or member 81. With the valve 30 thus positioned the actuating pressure in cylinder 13 will react to move the part 11 until the pressure inlet port 20 is substantially aligned with the intermediate valve spool 34. When so positioned there will be a hydraulic balance at opposite sides of the piston 15, thus hydraulically locking the parts 10 and 11 against further relative movement.

The complete operation of the parts described should be readily apparent by reference to the drawing. Since nut 39 is carried by the member 10 when in projected position in engagement with screw 31 as shown in the drawing, it definitely determines the position of the screw with respect to said member 10. Rotation of the screw in one direction or the other will, therefore, axially shift the screw and valve member 30 with respect to member 10 and at the same time the valve-screw element, due to its sliding mountings in bushings 19 and 44 will move with respect to the member 11. While the relationship of the valve 30 and spool 19 have been shown in exaggerated displacement for clarity of disclosure in the drawings, it is to be understood that these elements constitute a conventional type of servo-valve mechanism in which a slight displacement of but a fractional part of a thousandth of an inch of the valve disc or spool 34 with respect to the pressure inlet port 20 will vary the pressure conditions in the cylinder 16 in a manner to effect relative movement of the parts 10 and 11 in a direction and to an extent exactly according with the amount of axial movement of screw 31 with respect to the member 10. Consequently, the rate and extent of relative movement of the parts 10 and 11 is in exact accordance with the rate of translation effected by rotation of the screw. As shown, this screw may be rotated either by the motor 54 or alternatively at varied rates and directions as desired by manual operation of the hand wheel 55. As the hydraulically effected reaction in the cylinder 16 is at all times instantaneous, there is actually but very slight relative movement of the screw axially with respect to the member 11, which movement, of course, is reflected under these conditions in a slight oscillation of the shifter 83. It will be noted that the clevice 82 has its terminal ears sufficiently spaced to permit on the one end of oscillation of the member 83 without interference with the position determinator 81 during ordinary operation of the machine, this clearance likewise being sufficient to permit member 79 to oscillate to an extent sufficient so that 97 will depress valve 42 to an extent that its spool 66 will permit necessary flow from pressure conduit 67 into 41 without restricting engagement between 81 and 82.

The foregoing is the operative relationship of the parts when normal relative translation of elements 10 and 11 is being effected. However, when trip 74 is actuated by dog D, and valve spool 66 is depressed, the hydraulic control circuit is energized. This simultaneously effects several results. The pressure is introduced below plunger 72 tending to rock clevice 82 in a clockwise direction so that the lower portion thereof will be firmly held against the position determinator 81. At the same time pressure is introduced against 38 to retract nut 39. The screw 31 is, therefore, no longer connected to the member 10 but is free to move with member 11 as well as with respect to member 11 and at the same time by action of the pressure against plunger 60 clutch 50 is moved to the right so that there is no further rotation of screw 31. It will, of course, be noted that with the nut 39 retracted, rotation of the screw, even if continued, could have no effect on control of movement of the parts. Under this set of circumstances any oscillation of member 83 will be reflected in a translatory movement of screw 31 and valve member 30. For the automatic accurate stop positioning of the parts dog 37 through linkage 74, 78, and 79 definitely establishes the location of the position determinator 81 on part 11 with respect to the dog on part 10. At the same time member 72, urging the lower part of clevice 82 against the determinator, rocks 83 to effect an equally definitely determined positioning of screw 31, valve 30, and valve spool 34. Any depression of valve 30 effected by reaction of 72 on 83 will move the inner part of the servo to establish the pressure condition, such as shown in the drawing in which the relative movement of part 10 would be upward and part 11 downward as there viewed. This would have the effect of moving bushing 19 and port 20 downwardly with respect to valve spool 34 and at the same time react on determinator 81 pressing downwardly on the clevice, tending to effect a slight compensating upward movement of the valve. These combined relative movements of the servo parts 19 and 30 will, therefore, establish the balanced pressure conditions necessary in cylinder 16 to stop and hydraulically lock the parts 10 and 11 against relative movement in the accurate relationship determined by interengagement between dog D and trip 74.

To effect slight retracting movements the handle 84 may be moved to rock 83 in a counterclockwise direction, thus raising the screw 31 and valve spool 30 so that pressure is introduced into the upper portion of cylinder 16, tending to effect upward movement of part 11, the nature of the pressure actuating piston 72 being such as to permit this manual oscillation of member 83 against the force of the plunger. It will, of course, be understood that such movement, if of extent sufficient to disengage D and 74, will release valve 42, connecting control circuit 41 to exhaust. Spring 40 will then expand, pressing the nut 39 into engagement with screw 31, thus taking over control by preventing any further direct axial sliding of screw 31 and limiting further adjustments to such as may be effected by manual or power rotation of the screw element.

It will, of course, be evident that the drum and associated dogs form in effect a pattern control cam in which the dogs may be individually adjusted for different desired successive relative positionings of the parts of the machine, and in which the cam drum as an entirety may be readily removed and replaced in the event it is desired to set up different drums or pattern cam devices for different standardized operations. It will further be evident that each indexing of the drum will bring a different dog or pattern portion into motion interrupting relation with the member 74 so that the various desired successive stopping of movement of the parts as for performance of a milling, drilling or other tooling operation may be readily effected. It will further be evident that at the completion of the operation handle 84 may be actuated to rock shifter 83 counterclockwise against the pressure exerted by 72, moving the screw and associate valve axially upward, effecting relative separating movement of the dog at point D and the trip end 74 of lever 73, and the lever 84 then shifted to a stop position while the drum is indexed, or alternatively, as the parts are held by light pressure the drum may be indexed to release contacts 74. In this event expansion of spring 64 will restore valve 42 to the position shown in the drawings when continued movement, until a succeeding interrupting dog is engaged, may be automatically effected.

This is, of course, dependent upon whether a restoring spring, such as 59, reacts to recouple the clutch 49 for continued drive when the valve 42 is released, as has been illustrated, or whether the clutch must be manually or otherwise restored into operative position before further rotation of the screw can be effected.

What is claimed is:

1. A machine tool or the like including a pair of relatively movable parts, a hydraulic piston and cylinder mechanism for effecting said relative movement, a source of hydraulic actuating medium, a servo mechanism including a translatable valve for controlling the flow of actuating medium as respects the piston and cylinder elements, a first means for effecting translating movement of the valve, means for rendering said valve translating means ineffective, alternatively effective means for holding the valve against movement when the translating means are rendered inoperative, said valve translating means including a releasable screw and nut mechanism and said holding means including a hydraulically actuable clamp, a hydraulic control circuit, and trip operable means for effecting energization of said hydraulic control circuit, said circuit having connections effective simultaneously to disengage the screw nut mechanism and to actuate the clamp.

2. The combination with a machine tool or the like including a pair of relatively translatable parts and a hydraulic motor for effecting their relative translation, of a precision positioning device for determining the relative positional adjustment of said parts, said device including a shiftable valve element for determining the rate and direction of relative movement of the parts, means for controlling the movement of said valve including driving means for effecting movement of the valves, a disconnector clutch for the driving means, a hydraulic control circuit coupled with said disconnector, valve means for determination of the effective pressure within said control circuit, a trip device carried by one of the relatively translatable parts reactively coupled with the valve means for actuation thereof, and a control device carried by the other of the relatively movable parts and having an actuating portion to engage the trip device whereby on relative movement of the parts interengagement of the actuating portion and trip device will shift the valve means to effect operation of the disconnector.

3. The combination with a machine tool or the like including a pair of relatively translatable parts and a hydraulic motor for effecting their relative translation, of a precision positioning device for determining the relative positional adjustment of said parts, said device including a shiftable valve element for determining the rate and direction of relative movement of the parts, means for controlling the movement of said valve including driving means for effecting movement of the valve, a disconnector clutch for the driving means, a hydraulic control circuit coupled with said disconnector, valve means for determination of the effective pressure within said control circuit, a trip device carried by one of the relatively translatable parts reactively coupled with the valve means for actuation thereof, a control device carried by the other of the relatively movable parts and having an actuating portion to engage the trip device whereby on relative movement of the parts interengagement of the actuating portion and trip device will shift the valve means to effect operation of the disconnector, a position determinator for the shiftable valve element actuable by the trip device, and means operable on shifting of the trip actuated valve to move the shiftable valve element to determinator established position.

4. In a machine tool or the like including a pair of relatively shiftable parts, driven means for effecting relative movement of the parts, means for controlling said relative movement including a trip device carried by one of the parts and movable in a prescribed path as respects the other, a pattern member carried by said other part having a plurality of elements selectively projectable into said path for engagement with the trip device on relative translation of the parts, means operable by the trip for interrupting operation of the driven means, a position determinator coupled with the trip for actuation thereby, and means actuable upon movement of the trip for effecting translation of the relatively movable parts to an extent limited by the determinator when the drive is interrupted.

5. In a machine tool or the like including a pair of relatively shiftable parts, driven means for effecting relative movement of the parts, means for controlling said relative movement including a trip device carried by one of the parts and movable in a prescribed path as respects the other, a pattern member carried by said other part having a plurality of elements selectively projectable into said path for engagement with the trip device on relative translation of the parts, means operable by the trip for interrupting operation of the driven means, a position determinator coupled with the trip for actuation thereby, means actuable upon movement of the trip for effecting translation of the relatively movable parts to an extent limited by the determinator when the drive is interrupted, and additional means for effecting relative movement of the parts in a direction to separate the trip and the selected pattern element.

6. A machine tool or the like including a pair of relatively translatable parts, a hydraulic motor for effecting said relative translation, a servo-valve mechanism for controlling said motor, a hydraulic actuating circuit couplable with the motor by way of the servo-valve mechanism, said servo-valve mechanism including a translatable valve element, means for effecting translation of said valve element including a screw and a retractable nut, additional means for effecting actuation of the valve when the nut is retracted, a trip device carried by one of the translatable parts, stop means carried by the other of said translatable parts for engagement with the trip to operate the same upon relative translation of the parts, a position determinator actuable by the trip, a control valve actuable by the trip, and hydraulic circuits including shiftable pistons under control of the valve for simultaneously retracting the retractable nut and for effecting shifting of the translatable valve element of the servo-valve mechanism to a position established by the trip controlled determinator.

7. A machine tool or the like including a pair of relatively shiftable parts and means for selectively controlling the relative shifting movement of said parts including a trip device carried by one of the parts and movable in a prescribed path as respects the other part, a pattern member carried by said other part having a plurality of elements electively projectable into said path for engagement with the trip device on relative translation of the parts, drive means including an hydraulically operable disconnected clutch for effecting the relative movement of the parts, a position determinator operatively coupled with the trip and actuable thereby a clamp for cooperative movement with respect to the determinator for establishing the relative position of the parts, hydraulic control circuits for the disconnector clutch and the clamp, and valve means operable by the trip on movement thereof for coupling hydraulic actuating medium with said hydraulic control circuits for effecting operation of the clutch and clamp upon movement of the trip.

8. The combination with a pair of relatively movable parts, of a piston coupled with one of said parts and a cylinder for the piston coupled with the other of said parts for effecting their relative movement, a hydraulic pressure circuit, means for determining the reaction of the circuit on the piston cylinder mechanism including a first valve element movable with one of the parts and a second valve element movable with and relative to the said part and its associate valve element, an actuating screw for said second valve element, a half-nut carried by the other part and movable into and out of engagement with the screw, means for rotating the screw whereby engagement of the screw with the nut will effect relative movement of the two valve elements, a hydraulic disconnector for the nut, a trip device carried by one of the relatively movable parts and movable in a definite path as respects the other of said pair of parts, a pattern element carried by the other part having a series of stop numbers selectively projectable into said path of relative movement for engagement with the trip device, a determinator positionable by movement of the trip device, supplemental control means for effecting translation of the movable valve with respect to its support, means for urging said supplemental control means into engagement with the determinator for effecting a definite positioning of the movable valve element, and means actuable upon movement of the trip for effecting actuation of the hydraulic disconnector for disengagement of the nut from the screw and for effecting simultaneous activation of the supplemental control means to establish selected positional relationship between the relatively movable parts.

9. The combination with a pair of relatively movable parts, of a piston coupled with one of said parts and a cylinder for the piston coupled with the other of said parts for effecting their relative movement, a hydraulic pressure circuit, means for determining the reaction of the circuit on the piston cylinder mechanism including a first valve element movable with one of the parts and a second valve element movable with and relative to the said part and its associate valve element, an actuating screw for said second valve element, a half-nut carried by the other part and movable into and out of engagement with the screw, means for rotating the screw whereby engagement of the screw with the nut will effect relative movement of the two valve elements, a hydraulic disconnector for the nut, a trip device carried by one of the relatively movable parts and movable in a definite path as respects the other of said pair of parts, a pattern element carried by the other part having a series of stop members selectively projectable into said path of relative movement for engagement with the trip device, a determinator positionable by movement of the trip device, supplemental control means for effecting translation of the movable valve with respect to its support, means for urging said supplemental control means into engagement with the determinator for effecting a definite positioning of the movable valve element, means actuable upon movement of the trip for effecting actuation of the hydraulic disconnector for disengagement of the nut from the screw and for effecting simultaneous activation of the supplemental control means to establish selected positional relationship between the relatively movable parts, and additional means for actuating the supplemental control means to effect relative movement of the said relatively movable parts.

10. The combination with a machine tool including a pair of relatively movable parts and a piston and cylinder mechanism for effecting such relative movement, of a hydraulic circuit couplable with the piston cylinder mechanism for effecting relative movements, a servo-valve mechanism carried by one of the parts for determining the effective coupling of the hydraulic circuit to said piston cylinder mechanism, said servo-mechanism including a ported member fixed with the part and a cooperating valve member movable with and with respect to the part, an actuator for the valve having a threaded portion, a retractable nut carried by the other of said relatively translatable parts, means for effecting engagement of the nut with the threaded portion of the valve actuator and precision positioning mechanism for determination of accurate relative positioning of the parts including a shifter interengaged with the valve actuator, a trip operable valve position determinator having a portion projecting for engagement with the shifter, means for disengaging the nut from the valve actuator to permit independent movement thereof, and means for holding the shifter against the position determinator whereby the position of the valve and its actuator will be determined by the interengagement of the shifter and position determinator.

11. A machine of the character described including a pair of relatively translatable parts, a hydraulic motor for effecting translation of the parts, a servo-mechanism including a shiftable valve for controlling the actuation of the motor, a first nut and screw means for effecting positionings of the valve member, an independent shifter for effecting positionings of the valve member, a trip operable position determinator, and means for moving the shifter into engagement with the determinator for positioning the valve member.

12. The combination with a machine tool embodying a pair of relatively translatable parts and a driven servo-mechanism including a shiftable valve member for controlling the relative movement of the parts, said precision mechanism including a shifter pivoted to one of the parts and coupled to the valve member for effecting movement thereof, a trip positionable position determinator carried by said member and extending into the potential path of movement of a portion of the shifter, and trip activated means for moving the shifter into engagement with the position determinator whereby the valve will be correspondingly shifted and held.

MILLARD ROMAINE.
ERWIN G. ROEHM.

REFERENCES CITED

The following references are of record in the file of this patent:

UNITED STATES PATENTS

| Number | Name | Date |
|---|---|---|
| 1,687,369 | Lapointe | Oct. 9, 1928 |
| 1,877,701 | Speck | Sept. 13, 1932 |